Dec. 18, 1956 R. D. HEILSHORN 2,774,858
METHOD OF AND APPARATUS FOR WELDING LAP SEAMS
Filed May 10, 1954 10 Sheets-Sheet 1
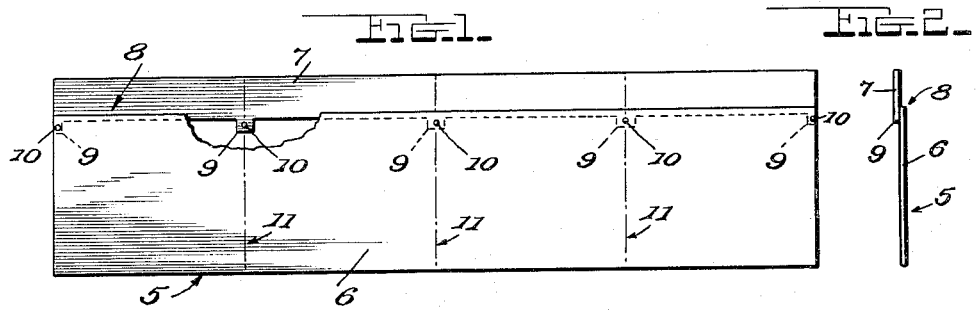
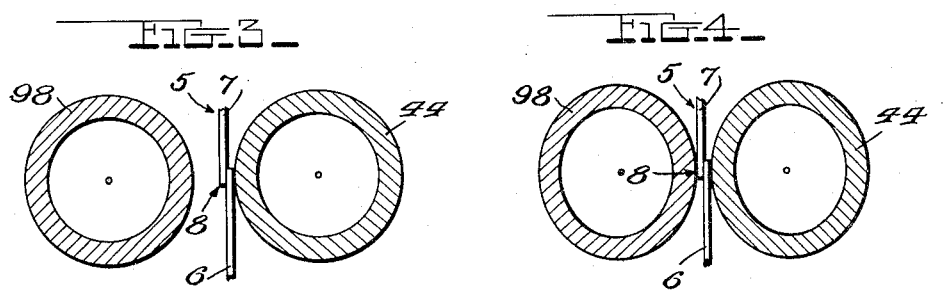
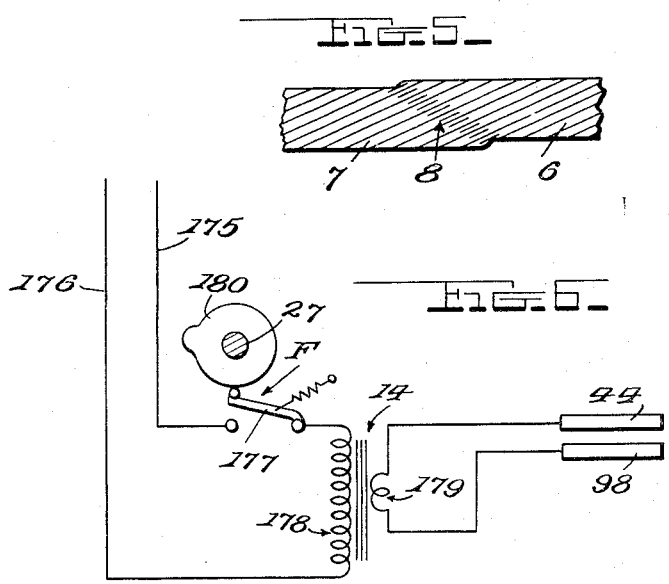
INVENTOR
*Richard D. Heilshorn*
BY
*Mason, Porter, Diller & Stewart*
ATTORNEYS

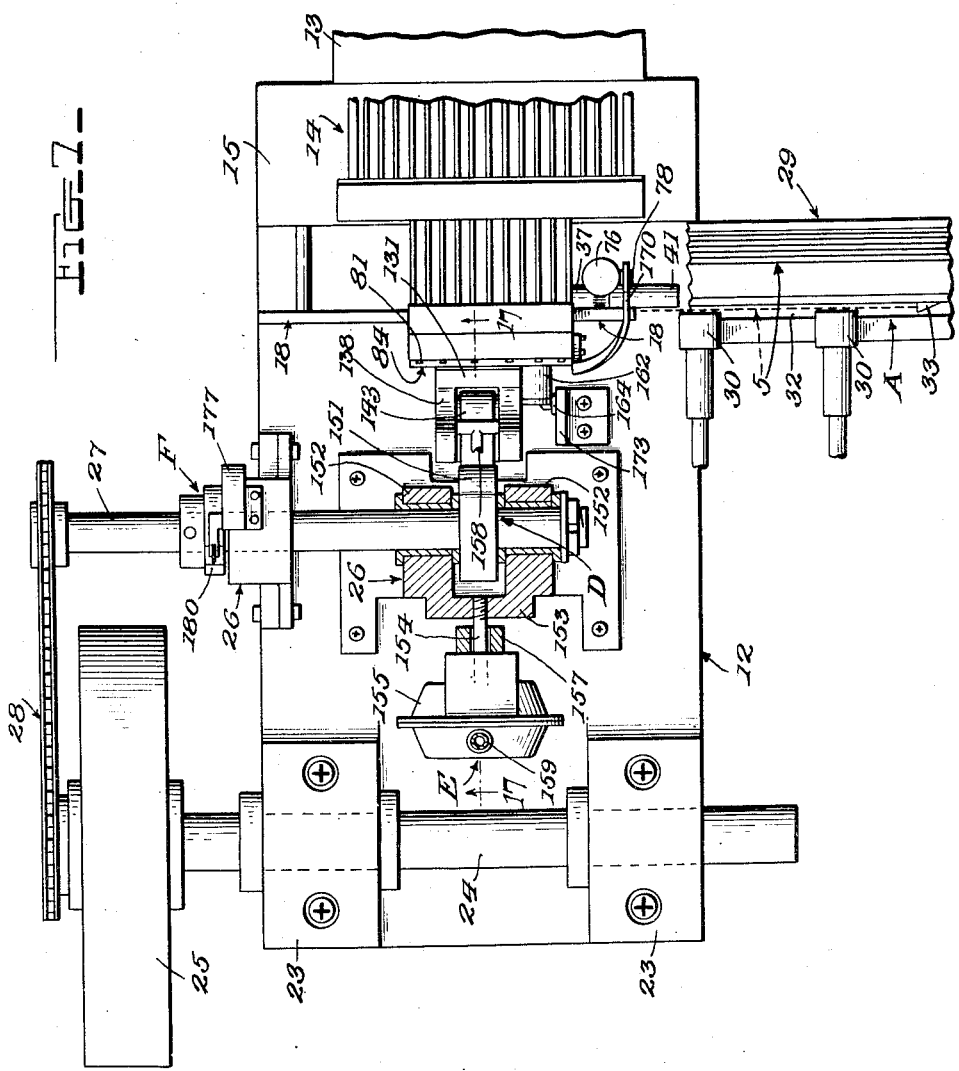

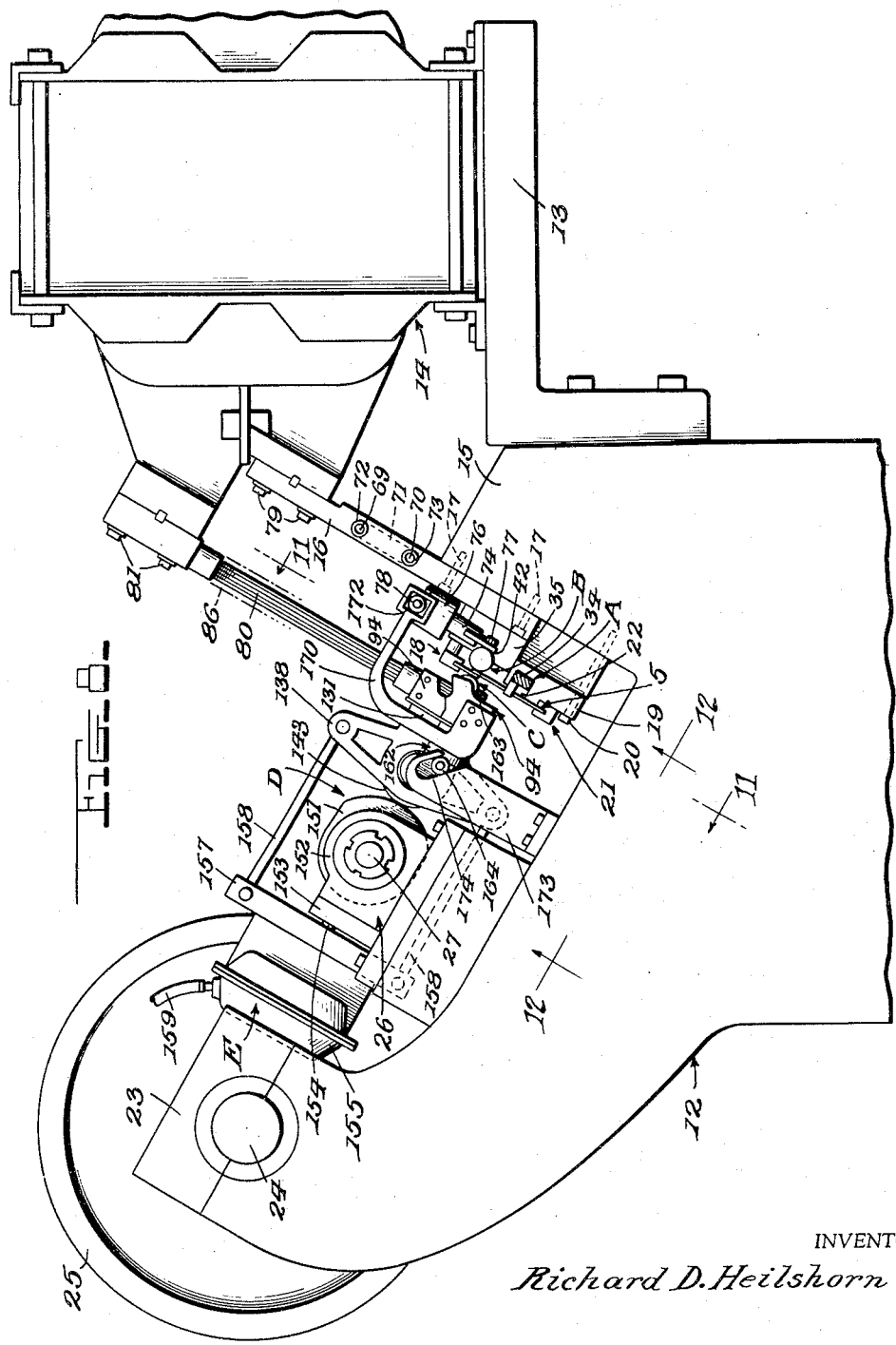

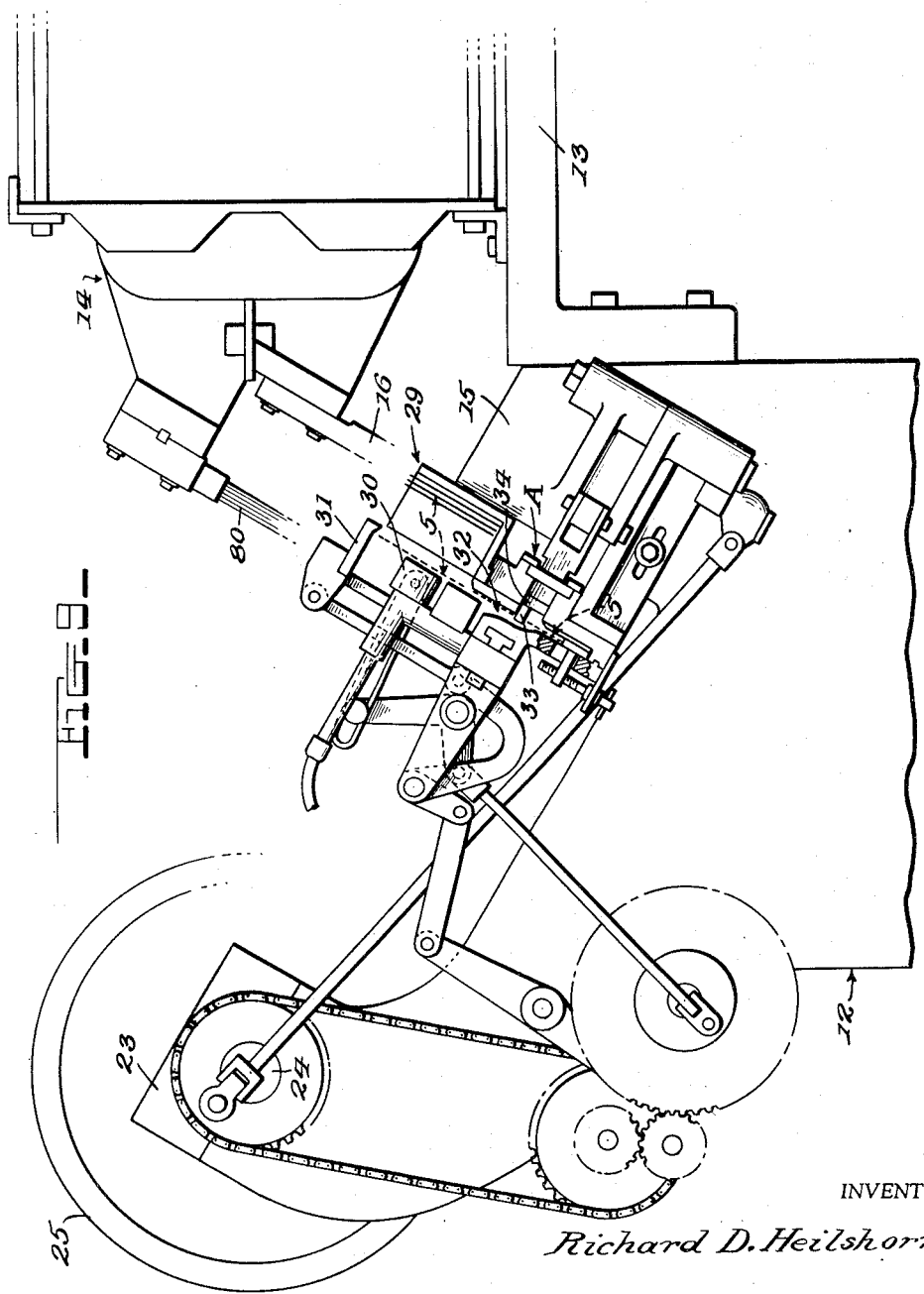

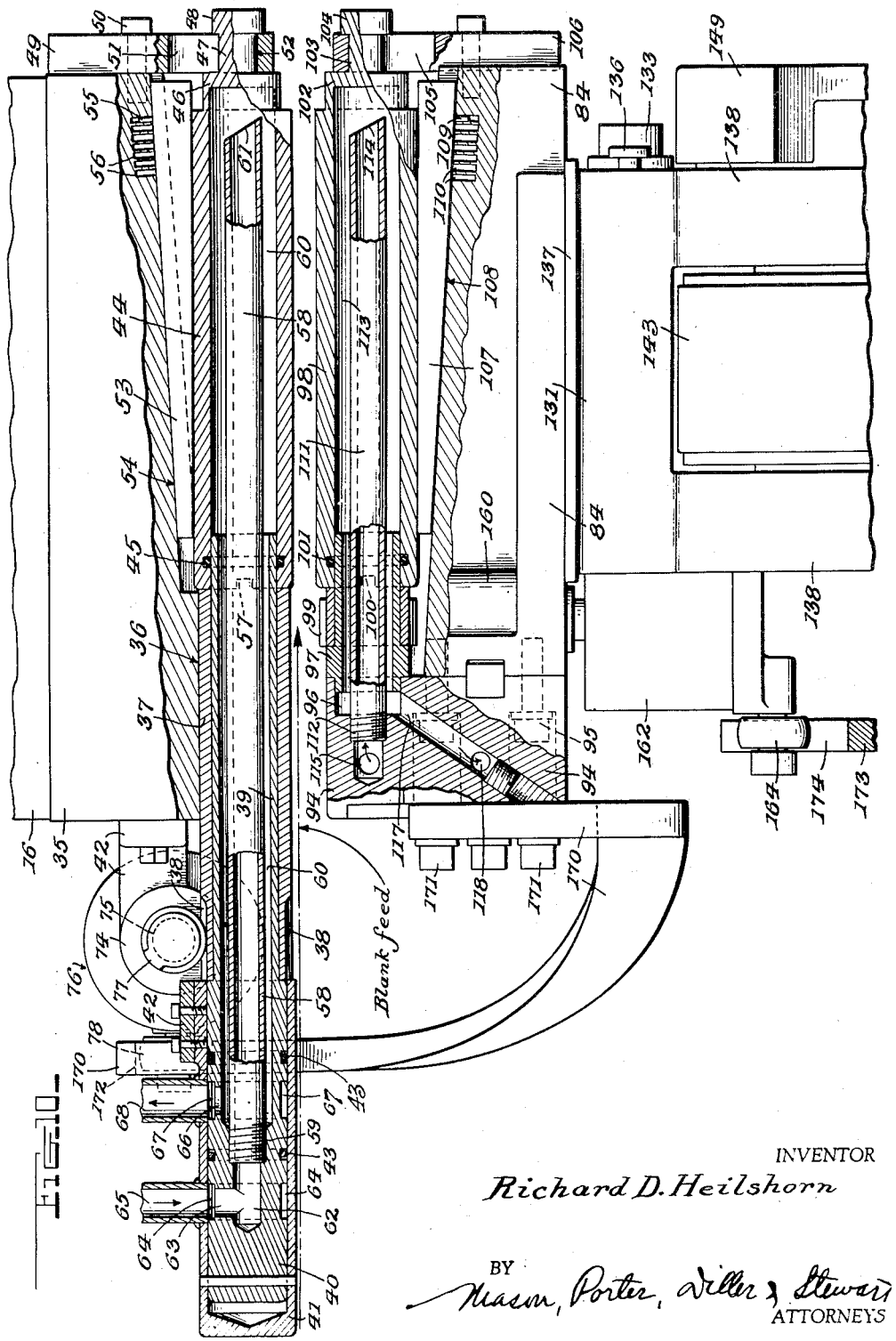

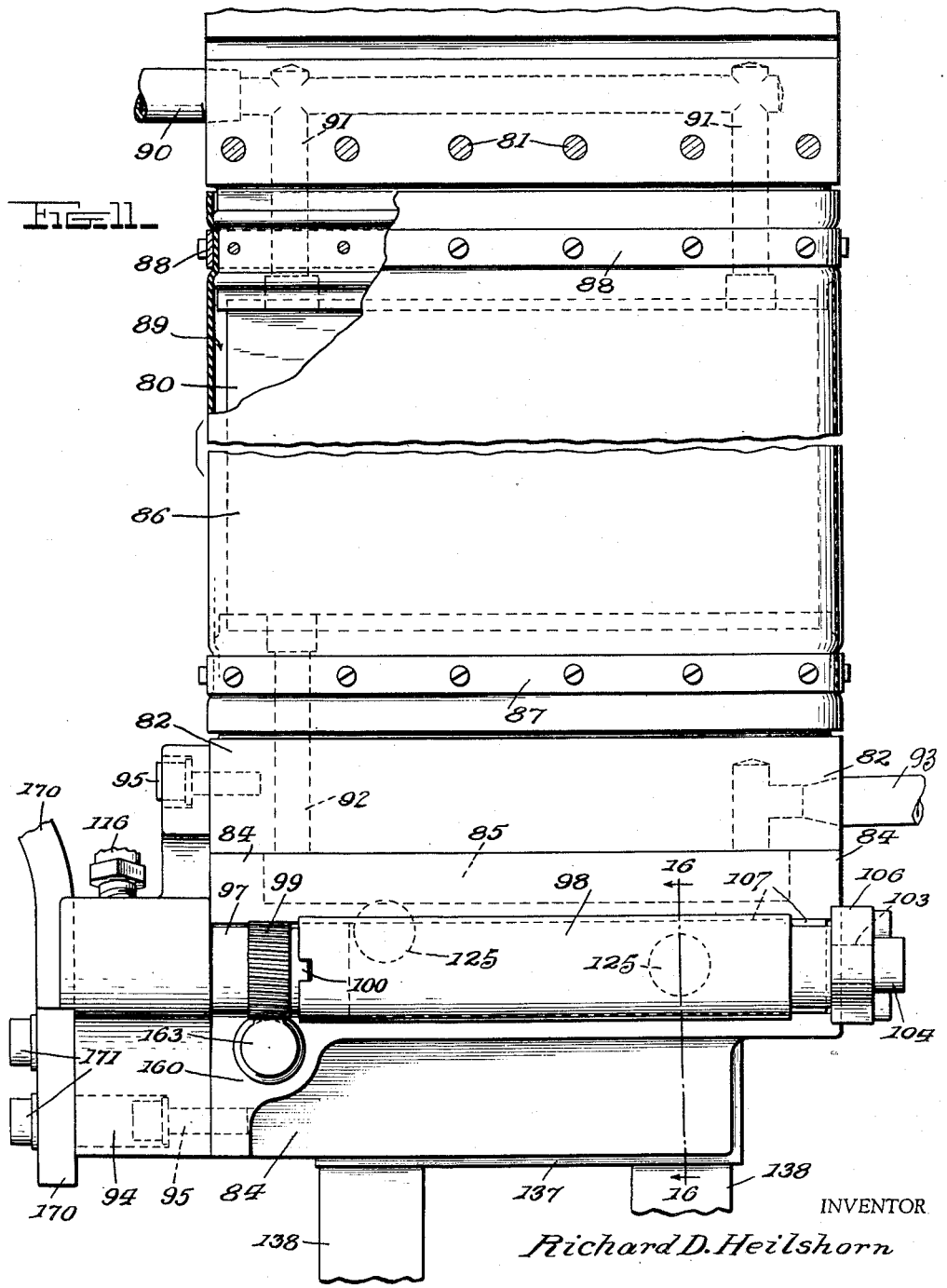

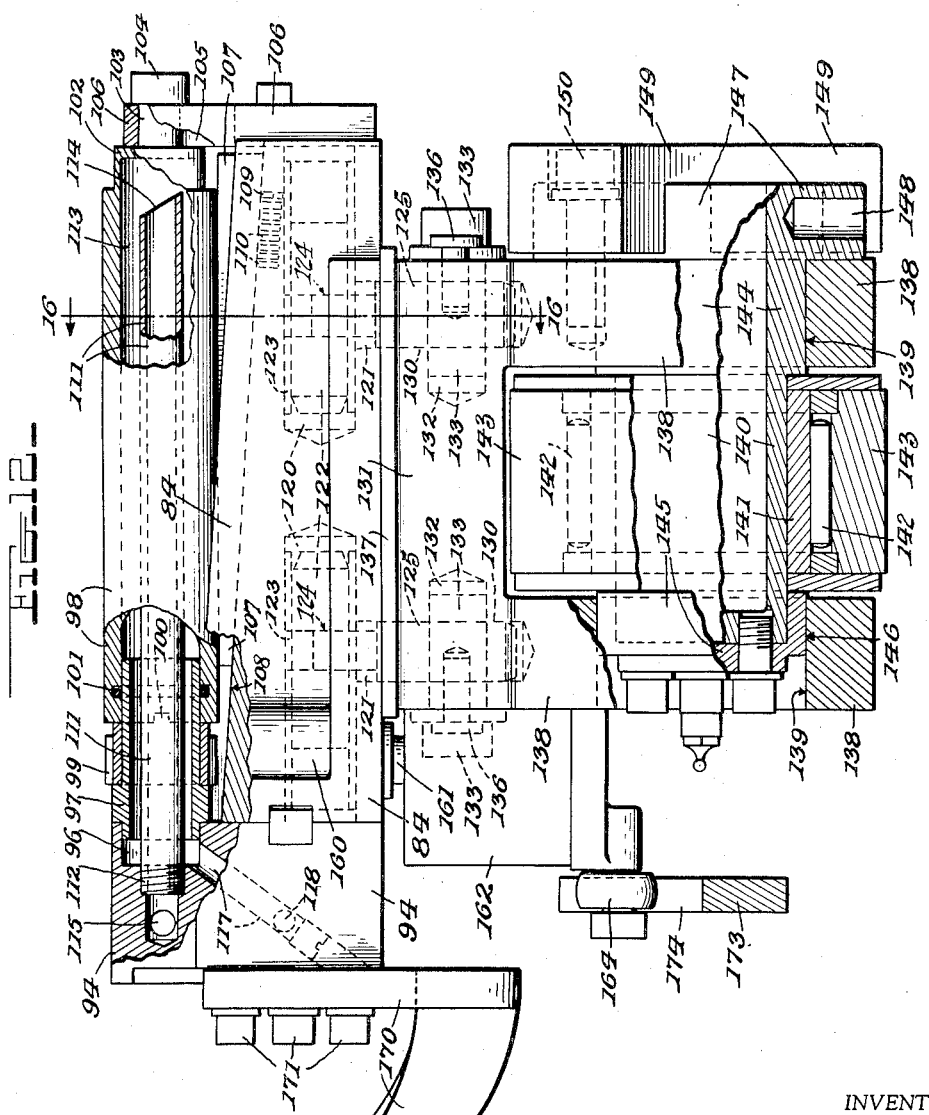

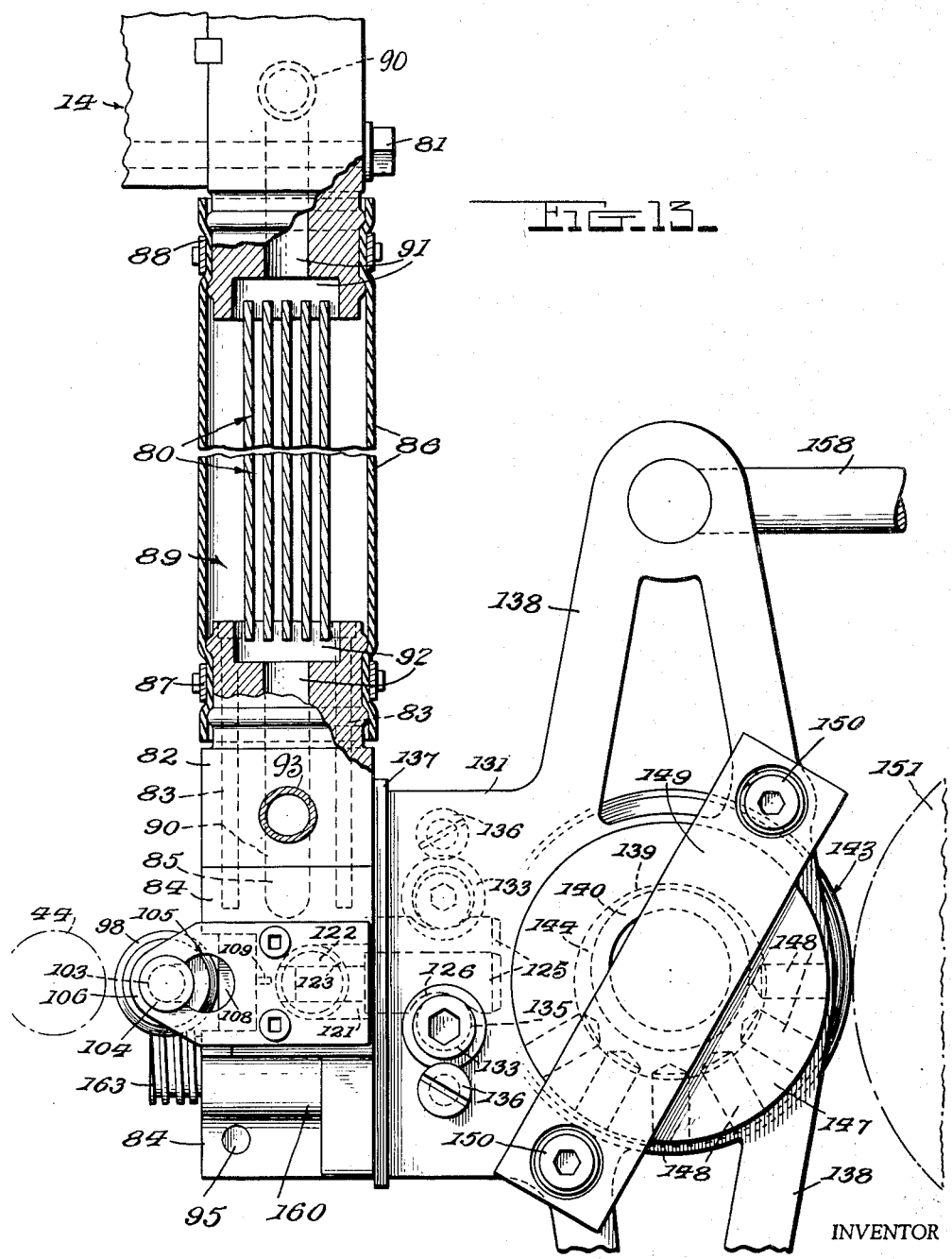

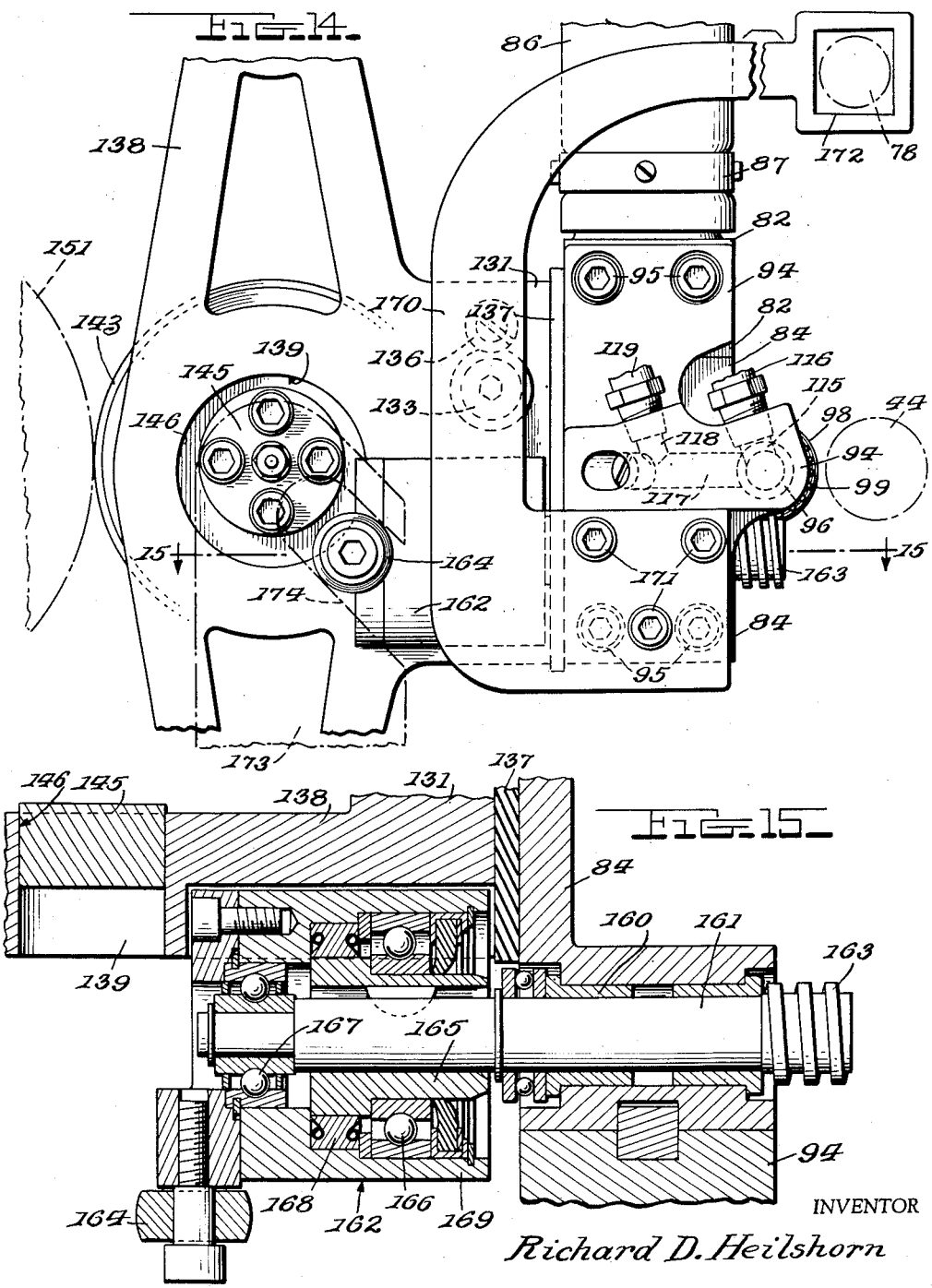

Dec. 18, 1956 R. D. HEILSHORN 2,774,858
METHOD OF AND APPARATUS FOR WELDING LAP SEAMS
Filed May 10, 1954 10 Sheets-Sheet 10
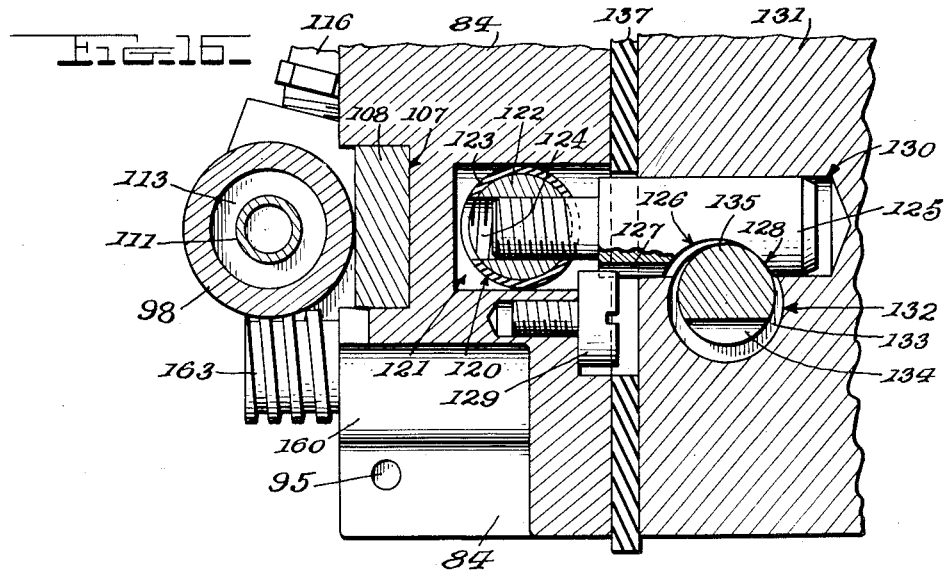
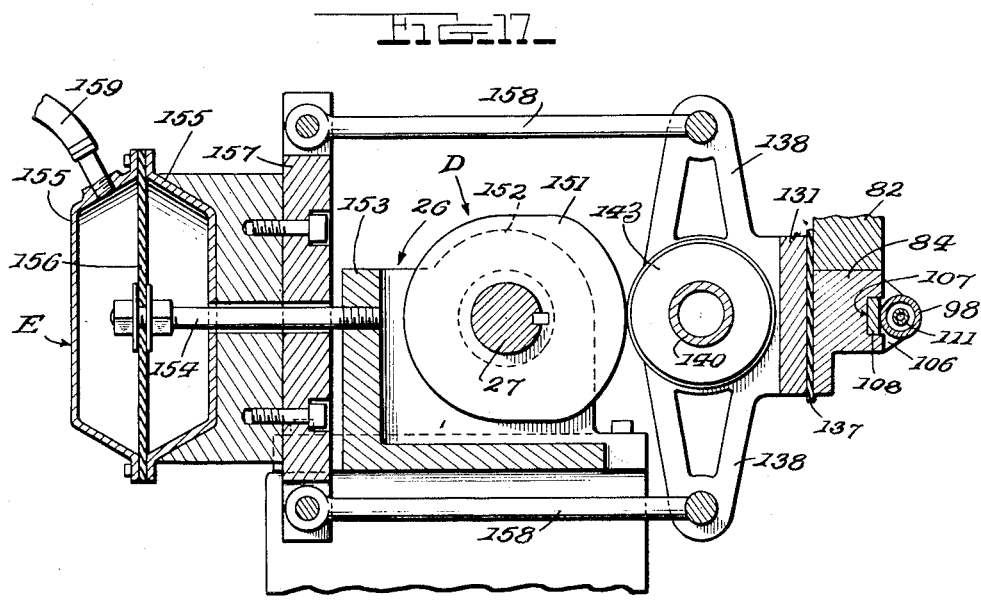
INVENTOR
Richard D. Heilshorn
BY
Mason, Porter, Diller & Stewart
ATTORNEYS

# United States Patent Office 2,774,858
Patented Dec. 18, 1956

2,774,858

METHOD OF AND APPARATUS FOR WELDING LAP SEAMS

Richard D. Heilshorn, Chicago, Ill., assignor to Continental Can Company, Inc., New York, N. Y., a corporation of New York Application May 10, 1954, Serial No. 428,592

33 Claims. (Cl. 219—78)

The invention relates generally to the art of welding, and more particularly to the welding of elongated seams formed by the overlapping of thin sheet metal edge portions, and it primarily seeks to provide a novel method of and apparatus for welding such seams rapidly and efficiently between electrodes gripping the seam between them throughout the full length of the seam, and by employment of a single shot electrical impulse.

An object of the invention is to provide a method of the character stated wherein the elongated seams are formed of sheet metal edge portions overlapping to a very limited extent, say one thirty-second of an inch or less, and wherein each said seam is gripped throughout the full length thereof between electrodes through which a single shot electrical impulse is passed to bring about the desired fusing of the metal in the lapped seam length, progressive pressure being applied throughout the fusing of the metal so as to reduce the thickness of the seam almost to the thickness of the sheet metal from which the seam is formed.

Another object of the invention is to provide a method of the character stated wherein the modulus of elasticity of the electrode material is employed to provide the progressive follow-up pressure which is effective during the fusion of the lapping seam portions to reduce the seam thickness to approximately the thickness of the sheet metal from which the seam is formed.

Another object of the invention is to providea method of the character stated wherein the sheet metal with edge portions overlapping in the manner stated is fed along step-by-step, and an elongated one shot seam length weld is formed at each rest interval, the sheet metal length thereafter being divided into individual seam lengths.

Another object of the invention is to provide a novel apparatus in which to practice the steps of the method.

Another object of the invention is to provide an apparatus of the character stated wherein each seam welding is accomplished between a pair of elongated tubular electrodes which grip the lap seam firmly between them during the welding and are deformed from a normal circular cross section to a slightly oval or elliptical cross section upon initial pressure contact with the seam, and then, because of their inherent elasticity or resiliency and the resulting tendency to return to their normal circular cross sections, progressively but very rapidly return toward their normal circular cross section and progressively apply residual pressure during the fusing of the metal in the weld so that the resulting thickness of the welded seam approximately corresponds to the thickness of the sheet metal of which the seam is composed.

Another object of the invention is to provide an apparatus of the character stated wherein there are included means for bringing about relative movement between the electrodes to separate them during the feeding of a work piece into position between them and then bring them together in seam welding position, means for feeding work pieces to be welded, and means for adjusting the position of one electrode relative to the other for wear compensation or pressure application adjusting purposes.

Another object of the invention is to provide an apparatus of the character stated wherein one electrode is stationarily mounted and the other is movable toward and from the same, and wherein the movable electrode is mounted on a carrier equipped with a follower roller and there are included a rotary cam engaging the roller and effective to control the position of the movable electrode, and means for holding the roller against the cam.

Another object of the invention is to provide an apparatus of the character stated wherein the follower roller of the movable electrode carrier is mounted on an eccentric stud which is turnable in the carrier to vary the position of the roller on the carrier and the relation of the movable electrode to the electrode position controlling cam.

Another object of the invention is to provide an apparatus of the character stated wherein the means for holding the roller against the cam serves as the means for bringing about relative movement of separation between the electrodes and includes an air pressure actuated means operatively connecting the same with the movable electrode carrier.

Another object of the invention is to provide in an apparatus of the character stated and including elongated tubular electrodes opposing each other with their axes in parallel relation, means for imparting unidirectional and small increment rotational movements to the electrodes following each welding cycle to assure the progressive presentation of fresh welding surfaces to the work.

Another object of the invention is to provide an apparatus of the character stated wherein each of the tubular electrodes has a worm gear coupled with an adjuster shaft which has a uni-directional clutch thereon including a radially projecting follower, there being included means engaging the followers in a manner for imparting to both electrodes the desired small increment rotational movements during the travel of the swingable electrode away from the stationary electrode.

Another object of the invention is to provide an apparatus of the character stated wherein are included a novel arrangement for circulating a coolant through each of the stationarily and movably mounted tubular electrodes.

Another object of the invention is to provide an apparatus of the character stated in which the means for circulating a coolant through at least one of the tubular electrodes includes a flow tube extending longitudinally of the electrode and spaced inwardly of the inner wall thereof in a manner for providing a coolant inlet flow in one direction through the flow tube from one end to the other of the electrode and thence in the opposite direction in the space surrounding the flow tube and out through the same end at which the coolant entered.

Another object of the invention is to provide an apparatus of the character stated wherein the stationarily mounted electrode is secured on a fixed plate with which one connection with the current circuit is made, and the movable electrode is mounted on a carrier attached to a laminated lead with which the other connection with the current circuit is made, a boot being mounted over said lead, and there being included means for circulating a coolant through the fixed plate, and means for circulating a coolant through the carrier and the boot about the laminated lead.

Another object of the invention is to provide an apparatus of the character stated wherein at least one of the tubular electrodes is backed up by a longitudinally adjustable wedge, novel means being included for securing the wedge in positions of adjustment.

Another object of the invention is to provide an apparatus of the character stated wherein at least one of the tubular electrodes has a quick detachable mounting on a carrier block which in turn has a quick detachable mounting on a carrier.

Another object of the invention is to provide an apparatus of the character stated wherein the cam means effective to impart the small increment rotational movement to the tubular electrodes comprises a cam movable with the movable electrode and engaging the follower associated with the stationary electrode, and a stationarily mounted cam engaging the follower associated with the movable electrode.

A further object of the invention is to provide an apparatus of the character stated wherein one electrode is stationarily mounted and the other is movable toward and from the same, and wherein there are included means for passing electric current through the electrodes and the seam when the latter is gripped between the electrodes to provide a one shot fusing and welding of the metal in the seam, the movable electrode being mounted on a carrier equipped with a follower roller, and there being included a rotary cam engaging the roller and effective to control the position of the movable electrode, and said current passing means including a circuit controlling switch and a timing cam rotatable with the rotary cam and engageable with the switch.

A still further object of the invention is to provide an apparatus of the character stated wherein the electrodes are so spaced that when the movable electrode is at full stroke toward the opposing electrode the distance between centers of the electrodes will be slightly less than the sum of the radii of the electrodes, whereby the electrodes will be slightly deformed to a non-round cross section on mutual pressure contact, even when no work is gripped between them.

With the above and other objects in view that will hereinafter appear, the nature of the invention will be more clearly understood by reference to the following detailed description, the appended claims and the several views illustrated in the accompanying drawings.

In the drawings:

Figure 1 is a plan view of an example work piece to be welded in accordance with the invention;

Figure 2 is an end edge view of the work piece shown in Figure 1;

Figure 3 is an enlarged cross sectional view showing the electrodes in separated relation with a work piece lap seam in position between them prior to a welding operation.

Figure 4 is a view similar to Figure 3 showing the electrodes brought together against the lap seam and deformed to a somewhat elliptical cross section by contact with the seam immediately prior to the fusing of the metal in the welding operation;

Figure 5 is an enlarged fragmentary cross section illustrating a lap seam after completion of the weld;

Figure 6 is a diagrammatic view illustrating one manner of connecting the electrodes in a weld effecting and timing circuit;

Figure 7 is a somewhat diagrammatic plan and part horizontal sectional view illustrating the invention;

Figure 8 is a somewhat diagrammatic left end elevation illustrating the welding apparatus;

Figure 9 is a somewhat diagrammatic end elevation illustrating work feeding devices;

Figure 10 is an enlarged fragmentary longitudinal sectional view looking upwardly and illustrating the stationary electrode and its mounting, the movable electrode being shown in spaced relation therewith;

Figure 11 is an enlarged fragmentary view looking in the direction of the arrows 11—11 in Figure 8 and illustrating the movable electrode and its mounting;

Figure 12 is an enlarged fragmentary view looking in the direction of the arrows 12—12 in Figure 8 and illustrating the movable electrode and its mounting, parts being broken away and in section;

Figure 13 is a right end view of the parts shown in Figure 12;

Figure 14 is a left end view of the parts shown in Figure 12;

Figure 15 is a longitudinal sectional view taken along the line 15—15 of Figure 14 showing the means for imparting small increment uni-directional rotation to the movable electrode;

Figure 16 is a sectional view taken along the line 16—16 of Figure 12 illustrating one of the devices for effecting a quick detachable mounting of the movable electrode holder on its carrier; and Figure 17 is an enlarged fragmentary cross sectional view taken along the line 17—17 of Figure 7 illustrating the fluid actuated means for holding the follower roller of the movable electrode carrier against the actuator cam.

In the example disclosure of the invention herein made the one shot welds are executed on successively presented lap seam length portions of a composite work piece such as is shown in Figure 1. It is to be understood, however, that the invention can be practiced on a wide variety of work pieces, and the welding of the side seams of can bodies is one adaptation to be considered within the purview. The work piece of Figure 1 is in the form of an elongated rectangular body 5 composed of a major width strip 6 and a minimum strip 7 overlapped slightly at 8 to form a lap seam. The strip 7 has small lugs 9 projecting from its lapped edge, and these are initially spot welded at 10 to hold the assembly. In practicing the invention, the work piece is fed successive step distances equal to the spacing between the dividing lines 11, and at each rest interval, the then presented lap seam length will be welded by employment of a single shot electrical impulse.

The machine structure herein shown as a means for practicing the invention includes a work feeding means generally designated A, a fixed electrode B, an electrode C which is movable toward and from the fixed electrode, means generally designated D for moving the electrode C toward the electrode B, means generally designated E for moving the electrode C away from the electrode B, and circuit controlling or weld timing means generally designated F. See Figures 7 and 8.

There is included a frame structure generally designated 12 and including an extension or shelf portion 13 whereon to support the transformer 14. The frame also includes a bed portion 15 which serves as a support for the fixed electrode mounting plate 16, the same being secured thereon at 17.

The plate 16 supports the upper work piece edge-receiving guide 18 and the bed portion 15 has a bracket 19 secured thereon at 20 and which supports the lower work piece receiving guide 21 and provides a slideway 22 in which to receive the feed bar of the work feeding means.

The frame 12 also provides bearing means 23 in which to rotatably support a drive shaft 24 to which rotation is imparted in any approved manner, as by belt transmission to the driver pulley 25. The frame 12 also provides bearing means 26 in which to rotatably support a cam shaft 27 to which rotation is imparted through sprocket and chain connections 28 with the drive shaft 24.

The work feeding means A may be of any approved form capable of feeding the work pieces step-by-step while positioned between the guides 18 and 21. An example of a satisfactory work feeding means is to be found disclosed in U. S. Letters Patent 1,529,054 issued to William Cameron on March 10, 1925. Such work feeding means includes a magazine or stack 29 from which the work pieces are picked up one by one by the reciprocating suction heads 30 to clear them from the stack and place them in position before pushers or transfer members 31, Figure 9, which are reciprocable transversely of the direction of movement of the suction heads and which serve to place the individually transferred pieces in the feed channel 32 where they can be picked up and fed step-by-step by feed dogs 33 carried by the reciprocable feed bar 34. The operation of step-by-step feed means of this character is well known, and in view of the conventional nature of this work feeding means and the disclosure in the patent to which reference has been made, it is deemed unnecessary to describe the work feeding means in greater detail herein.

A stationary electrode mounting block 35, best shown in Figures 8 and 10, is fixed in any approved manner on the plate 16 and provides at least partial rotary bearing at 36 for a sleeve 37 having a long pinion gear portion 38 thereon at a point spaced endwise from the supporting block 35. The sleeve 37 is rotatably supported on a long sleeve 39 projecting endwise from a coolant directing head 40 which is supported in a cylinder 41 in the manner clearly illustrated in Figure 10. It will be noted that the cylinder 41 is open at one end only and is supported at 42 on the fixed block 35. Annular grooves in the external surface of the head 40 have O ring seals 43 therein, serving to prevent egress of coolant through the open end of the cylinder 41.

The end of the sleeve 39 projects into the open end of a stationary tubular electrode 44. The electrode 44 is equipped with an internal annular groove surrounding the extended end of the sleve 39, and an O ring 45 is mounted in the groove to seal the open end of the electrode. The other end of the electrode 44 is reduced in diameter and closed at 46, and it has an additionally reduced central extension 47 and terminates in an enlarged head 48. A retainer plate 49 is provided and is removably secured as at 50 to an end of the fixed block 35. The plate 49 has a key hole opening therein to removably receive the electrode end, said opening including a large portion 51 to clear the head enlargement 48, and a small portion 52 to snugly receive the reduced diameter portion 47 of the electrode. The plate 49 thus constitutes a means for detachably connecting the electrode to the block 35. In the mounting of the electrode the open end thereof can be slipped over the extended end of the sleeve 39, and then by placing the plate 49 to insert the electrode end 48 through the large opening 51 therein, then moving the plate to cause the reduced diameter extension 47 of the electrode to be received in the small portion 52 of the key hole opening and securing the plate 49 to the block 35 by screws 50, a quick detachable mounting for the electrode is provided.

The fixed electrode 44 overlies a backup wedge 53 seated on inclined surface 54 in the block 35. The wedge 53 is provided with a pin 55 projecting from the inclined face thereof, said pin 55 being selectively receivable in holes 56 provided in the seat 54. It will be apparent that by selectively locating the pin 55 in one of the holes 56 the wedge 53 can be placed to provide a firm backing for the stationary electrode 44. Cooperating slot and lug means 57 provided on the electrode 44 and the abutting end of the sleeve 37 connect these parts so that rotation imparted to the sleeve 37 will in turn be imparted to the electrode 44.

A coolant discharge tube 58 is supported as at 59 in the head 40 and is spaced within the electrode 44 to provide a surrounding chamber 60. It will be apparent by reference to Figure 10 that the chamber 60 communicates with the interior of the tube 58 through an angular cut end 61 which is disposed adjacent the closed end of the electrode. A coolant is introduced into the tube 58 through a center bore 62 in the head 40, and through the lateral port 63 and the annular groove 64, from a coolant supply duct 65, and coolant returning through the electrode chamber 60 passes out through the lateral port 66 and the annular groove 67 into the return duct 68.

Coolant flow and return ducts 69 and 70 are provided in the fixed plate 16, and these are connected by a connecting duct 71 and are served by a coolant supply duct 72, the returning coolant being carried by the return duct. 73.

The supporting means 42 attached to the fixed block 35 supports a bearing 74 in which a shaft 75 is mounted for uni-directional rotation. The shaft 75 extends into and has operative connection with an overrunning clutch generally designated 76, and a worm 77 secured upon the lower end of the shaft 75 meshes with and is adapted to impart small increment uni-directional rotation to the sleeve pinion 38. The clutch 76 has a radially projecting follower 78, and the detailed construction of the clutch means and the operation thereof will be described in greater detail hereinafter.

The fixed electrode mounting plate 16 is connected at 79 with the transformer 14, as indicated in Figure 8, thus making an electrical connection between the fixed electrode 44 and the secondary of the transformer in the manner diagrammatically indicated in Figure 6. A secondary lead 80 is similarly secured at one end as at 81 to the transformer 14 and preferably takes the form of a laminae of beryllium copper alloy. The other end of the secondary lead 80 is secured to a support block 82 as indicated in Figures 11 and 13. The support block 82 is in turn secured by screws 83 to a movable electrode holder 84 formed of hard copper alloy and having a coolant flow chamber 85 therein. A heavy rubber boot 86 is secured at one end as at 87 to the support block 82, and at its other end as at 88 about the other end of the secondary lead 80 to form a coolant circulating chamber 89 surrounding the secondary lead 80. It is apparent that coolant entering through duct 90 can pass through porting 91, chamber 89, porting 92, flow chamber 85, and out through return duct 93.

An electrode supporting and coolant circulating head 94 is removably secured as at 95 to one end of the movable electrode holder 84 in the manner clearly illustrated in Figures 11, 12 and 14. The head 94 has a chamber 96 therein, and an electrode supporting sleeve 97 is piloted in the chamber 96 and secured to the head in any suitable manner. The sleeve 97 projects into the open end of the movable electrode 98 and forms a rotary bearing for a pinion sleeve 99 having a lug and slot drive coupling 100 with the adjacent end of the electrode 98 so that small increment uni-directional rotation imparted to the pinion sleeve 99 will in turn be imparted to the electrode 98.

Inwardly of its open end the electrode 98 is equipped with an internal annular groove surrounding the extended end of the sleeve 97 and carrying an O ring seal 101 effective to prevent leakage of coolant between the electrode 98 and the sleeve 97. At its other end the electrode 98 is reduced in diameter and closed at 102 and has an additionally reduced central extension 103 equipped with a head enlargement 104. As in the case of the previously described fixed electrode 44, the movable electrode 98 is detachably secured in position on the holder 84 and the extension of the sleeve 97 by engagement of the reduced end extension 103 of the electrode 98 in the key hole opening 105 of the retainer plate 106 which is removably attached to said holder 84 in the manner clearly illustrated in Figures 12 and 13. The key hole opening 105 is similar in structure and purpose to the previously described opening 51, 52 in the plate 49.

Like the fixed electrode 44, the movable electrode 98 overlies a backup wedge 107 seated on an inclined surface 108 of the holder 84. The wedge 107 is provided with a pin 109 projecting from the inclined face thereof, said pin 109 being selectively receivable in holes 110 provided in the seat 108. It will be apparent that by selectively locating the pin 109 in one of the holes 110 the wedge 107 can be placed to provide a firm backing for the movable electrode 98.

A coolant discharge tube 111 is supported at 112 in the head 94 and is spaced within the electrode 98 so as to provide a surrounding chamber 113 communicating with the interior of the tube 111 through the angle cut end 114 thereof disposed adjacent the closed end of the electrode 98. It will be observed by reference to Figures 12 and 14 that a lateral port 115 leads into the bore opening into the tube 111 and is connected with a coolant supply duct 116. Another port 117 connects the chamber 96 with a lateral port 118 which communicates with a coolant return duct 119.

Attention is directed to Figures 12 and 16 from which it will be apparent that the holder 84 is provided with two bores 120 each communicating with a transverse bore 121. A retainer pin 122 is mounted in each bore 120, being surrounded therein by an insulating sleeve 123. The retainer pins 122 are provided with transverse threaded holes 124 for receiving the reduced threaded ends of mounting pins 125. Each mounting pin 125 has an arcuate cross groove 126 at one side thereof, and a longitudinal groove 127 extending from the arcuate cross groove 126 to the respective reduced end. Lock screws 129 threaded into the holder 84 and engaged in the pin grooves 127 will serve to secure the pins 125 against turning.

The pins 125 enter receiving bores 130 in an electrode moving carrier 131. Associated with each bore 130 is a locking cam pin receiving bore 132 that transverses the bore 130, and receives a locking cam pin 133 which is turnable in each bore 132. Each locking cam pin 133 has an arcuate clearance groove 134 in one side thereof, and a cam portion 135 which engages the surface of the pin groove 126 at 128. A retaining screw 136 overlies a flange of each locking pin 133 and thus serves to retain the pin axially and yet permit its free rotation.

A quick detachable mounting for the movable electrode and its holder 84 on the carrier 131 is provided by the pins 122, 125, and 133, in the following manner. In Figure 16 a locking pin 133 in shown in position for securing the holder 84 in fixed position on its carrier 131. An insulating spacer 137 is disposed between the holder 84 and the carrier 131. It will be noted that the cam portion 135 of the pin is turned firmly against the groove surface 128 of the pin 125 so as to securely hold the pin 125 in its receiving bore 130 in the carrier 131. When it is desired to remove the holder 84 and the electrode 98 mounted thereon from the carrier 131 it is only necessary to turn the pins 133 to present the clearance groove 134 therein toward the pins 125 so as to clear the pins 125 and permit their withdrawal from the mounting bores 130.

The carrier 131 has parallel spaced cross head extensions 138 having axially aligned bores 139 therein to receive a roller mounting stud 140. As illustrated in Figures 12 to 14 of the drawings, a sleeve 141 mounted on the stud 140 provides the inner race for a roller bearing 142 on which the roller 143 is rotatably mounted. The stud 140 has an eccentric enlargement 144 received in one of the extension bores 139, and a cup 145 secured on the other end of the stud by screws and having an eccentric external surface 146 aligned with the eccentric enlargement 144 is positioned in the other extension bore 139. An enlarged head 147 is provided on the stud and is equipped with turning tool receiving recesses 148 so that it can be turned in a manner for causing the eccentric surfaces of the stud 140 and cup 145 to vary the spacing of the axes of the roller 143 and the associated electrode 98. A clamp bar 149 traverses the head 147 and is secured to the adjacent extension 138 by screws 150 for securing the stud 140 in the adjusted positions.

The roller 143 is engaged by an actuator cam 151 secured on the shaft 27. The shaft also extends through longitudinally spaced bearing members 152 connected by a cross head 153 in which a thrust rod 154 is anchored. See Figures 7, 8 and 17. The free end of the rod extends into a two-piece housing 155 and is secured to a diaphragm 156 which is clamped between the housing halves. The housing 155 is secured to a longitudinal cross head 157 which is connected at its ends by rods 158 with the ends of the cross head extensions 138 of the movable electrode carrier 131. An air duct 159 opens into the half of the housing 155 above the diaphragm 156, and it will be apparent by reference to Figure 17 that air pressure introduced through the duct 159 will tend to lift the whole housing 155, and the connected cross heads 157 and 138 because of the fixed mounting of the rod 154, and by this means the follower roller 143 will be held against the actuator cam 151.

As shown in Figure 15 the movable electrode holder 84 is equipped with a bearing 160 in which a shaft 161 is rotatably mounted. The shaft 161 extends through the overrunning clutch generally designated 162, and carries a worm 163 which meshes with the previously described pinion 99. Like the clutch 76 the clutch 162 includes a radially projecting follower 164. In each clutch the shaft is keyed to a sleeve 165 and the clutch cylinder is mounted on antifriction bearings 166 on sleeve 165 and on similar bearings 167 on shaft 161. Between the annular external surface of the sleeve 165 and the internal bore of the clutch cylinder are mounted sprags 168 which function in a manner well known to permit the clutch cylinder 169 to turn freely about the shaft 161 and sleeve 165 in one direction, but cause said cylinder to impart rotation to said sleeve 165 and shaft 161 when turned in the opposite direction.

As best shown in Figures 10, 12, and 14 a cam plate 170 is secured as at 171 on the head 94 and has a slot 172 engaged with the follower 78 of the clutch 76 associated with the stationary electrode 44. As shown in Figures 8, 12, and 14 a second cam plate 173 is rigidly supported on the frame 12 and has an angled cam slot 174 engaged with the follower 164 of the clutch 162 associated with the movable electrode 98. It will thus be apparent that as the movable electrode holder 84 is moved toward and from the fixed electrode 44 the follower 78 engaged by the movable cam plate 170 will be oscillated and the moving follower 164 will be oscillated by its engagement with the stationary cam 173. This oscillation of the clutches 76 and 162 will impart small increment uni-directional rotation to the pinions 38 and 99 and to the electrodes 44 and 98 with which they are coupled, thereby to constantly present fresh welding surfaces to the work pieces engaged between the electrodes.

In the wiring diagram illustrated in Figure 6 the power lines 175 and 176 connect with the transformer 14 through a timing switch 177, the connection being with the primary 178 of the transformer, and the electrodes 44 and 98 being connected as diagrammatically indicated with the secondary 179 of the transformer. A timing switch actuating cam 180 is mounted on the cam shaft 27 and is timed with the movable electrode actuator cam 151. When properly timed the switch 177 will complete the welding circuit after the movable electrode 98 has gripped the work-piece overlap 8 between it and the opposing fixed electrode 44, thereby to provide an electrical impulse and effect a one shot welding of each lap seam thus gripped between the electrodes simultaneously throughout the full length thereof.

In the operation of the welding apparatus the work feeding means moves the work pieces step-by-step into and through the guides 18 and 21, presenting a lap seam length between dividing lines 11, or between one such line and a piece end, at each advancing movement of the feed dog equipped slide bar 34. The parts of the apparatus are cooperatively timed so that before each feed motion of the work feeder bar 34 rotation of the cam 151 in contact with roller 143 causes the movable electrode 98 to separate from the fixed electrode 44. Pneumatic pressure above the diaphragm 156 in the housing 155 maintains yielding contact between the roller 143 and the cam 151, and thereby causes the movable electrode 98 to move away from the fixed electrode 44, as shown in Figure 3. Each time a work piece comes to rest between the electrodes, as shown in Figure 3, the cam 151 will become effective to move the electrode 98 against the lap seam, as shown in Figure 4. The pressure of the electrodes 44 and 98 against the work piece overlap 8 causes one or both electrodes to be deformed from a normal circular cross section to an abnormal non-circular cross section. While the electrodes are exerting pressure on the work piece overlap 8 the cam 180 closes the switch 177 to send a single shot electrical impulse through the electrodes and the gripped overlap to bring about a one shot fusing and welding of the overlap through the full length thereof to provide a lap welded seam of approximately single metal thickness, as shown in Figure 5.

The electrodes are formed of any suitable material having the electrical and physical characteristics required, such as may be found in numerous alloys of copper, for example, beryllium and copper, chromium and copper, etc. Of the physical characteristics, elasticity and resiliency are of primary importance. The modulus of elasticity of the electrode material is employed to provide progressive follow-up pressure during the progressive but very rapid return of the electrodes toward their normal circular cross section as the fusing of the metal is in progress. This is effective to provide the very efficient and thin lap seam shown in Figure 5.

The eccentric stud mounting 140 of the roller 143 can be utilized to adjust the amount of deformation of the electrodes when in contact with the work piece overlap, as well as to compensate for any reduction of the electrode diameters due to wear. It is preferred that the adjustment be such that when the movable electrode is at full stroke toward the fixed electrode, the distance between electrode centers is slighly less than the sum of the radii of the electrodes. In this manner both electrodes will be slightly deformed or elliptical when in mutual contact, or in other words when engaging with no work piece between them.

Many advantages flow from the particular structure and mounting of the electrodes, taking full advantage of the modulus of elasticity of the electrode material, as disclosed herein. The structure and arrangement provides a uniform distribution of the pressure applied over the contact length of the electrodes which minimizes variations of pressure due to non-uniform thickness of material. The deformed electrodes respond rapidly to the collapse of the material during fusion, because of the small mass of the material that must follow this rapid collapse, pressure being maintained during the entire fusion period. Uniform pressure, or at least, a controlled pressure over the full seam length, provides a uniform electrical contact resistance which will be substantially proportional to the pressure. It follows, therefore, that the electrical current will flow in direct relationship to the electrical resistance, and therefore, a principal objective is aimed at uniform current distribution with its resulting uniform heating of the seam.

The use of the pneumatic pressure housing 155 in connection with the cam 151 and follower roller 142 minimizes the disadvantages of inertia resulting from the employment of mechanical elements for the same purpose, and eliminates the necessity for using more massive mechanisms which create or add to the inertia problems. Furthermore the pneumatic pressure arrangement is a convenient means for providing an elastic pressure which is effective in the elimination of potential backlash with its attendant disadvantages.

Like the electrodes, the laminae of the secondary lead 80 may be formed of beryllium copper alloy or other suitable alloy. Thus the lead 80 is flexible and resilient so as to permit movement back and forth of the movable electrode 98 mounted thereon, but it also has linear dimensional stability for acting as a mounting arm or distance piece effective to very accurately place the movable electrode with relation to its companion or fixed electrode. The reason for this dimensional stability is that in swinging toward and away from the fixed electrode 44 the lead 80 operates well within the elastic limit of the material from which it is made.

It has been pointed out in detail how movement back and forth of the movable electrode carrier 84, the engagement of the movable cam 170 with the follower 78 of the stationary clutch 76, and the engagement of the follower 164 of the movable clutch 162 with the stationary cam 173 serves to impart small increment unidirectional movement to the worm and pinion couples 163, 99 and 77, 38 and to the movable and fixed electrodes 98 and 44 with which they are operatively connected, thereby to assure presentation of fresh electrode surfaces for successive welds.

After the rapid completion of each welding cycle the electrodes are separated in the manner previously described and a work piece advancement is effected to move the welded seam from between the separated electrodes and a succeeding unit weld length into position between the electrodes for rapid repetition of the cycle.

When multiple unit work pieces such as are exemplified in Figures 1 and 2 are being welded they may be broken or cut into unit weld lengths at the dividing lines 11 after being discharged from the welding apparatus, as before stated.

While example method steps and step sequences are disclosed herein, and example structural arrangements are described, it is to be understood that such steps and sequences and structural arrangements may be varied without departing from the spirit and scope of the invention as defined in the appended claims.

I claim:

1. The herein described method of welding elongated lap seams which comprises, placing the lap seam between opposing elongated electrodes extending the full length of the seam to be welded, bringing the electrodes together against the seam to tightly grip the seam between them, said electrodes being continuous so as to present an uninterrupted pressure surface throughout the full length of the seam and being deformable upon application of welding pressure and resilient so as to be adapted by reason of their inherent quality of returning after each pressure deformation to their normal cross section for applying follow up pressure as fusion of the seam takes place, and while so applying pressure to the seam, passing electric current through the electrodes and the gripped seam to provide a one shot fusing and welding of the metal in the lap seam throughout the full length thereof.

2. The herein described method of welding elongated lap seams which comprises, presenting the edge portions forming the seam in overlapping relation with said edge portions lapping not more than one thirty-second of an inch and between opposing elongated electrodes extending the full length of the seam, bringing the electrodes together against the seam to tightly grip the seam between them, said electrodes being continuous so as to present an uninterrupted pressure surface throughout the full length of the seam and being deformable upon application of welding pressure and resilient so as to be adapted by reason of their inheernt quality of returning after each pressure deformation to their normal cross section for applying follow up pressure as fusion of the seam takes place, and while so applying pressure to the seam, passing electric current through the electrodes and the gripped seam to provide a one shot fusing and welding of the metal in the lap seam throughout the full length thereof and, by said follow up pressure application as fusion of the seam takes place, reducing the thickness of the lapped and fused edge portions approximately to the thickness of the sheet metal of which the seam is formed.

3. The herein described method of welding elongated lap seams which comprises, presenting the edge portions forming the seam in overlapping relation with said edge portions lapping not more than one thirty-second of an inch and between opposing elongated electrodes extending full length of the seam, bringing the electrodes together against the seam to tightly grip the seam between them, passing electric current through the electrodes and the gripped seam to provide a one shot fusing and welding of the metal in the lap seam throughout the full length thereof, and progressively applying follow up pressure to the electrodes during the fusing of the metal to reduce the thickness of the lapped and fused edge portions approximately to the thickness of the sheet metal of which the seam is composed.

4. The herein described method of welding elongated lap seams which comprises, presenting the edge portions forming the seam in overlapping relation with said edge portions lapping not more than one thirty-second of an inch and between opposing deformable and elastic elongated electrodes extending the full length of the seam, bringing the electrodes together against the seam to tightly grip the seam between them and deform said electrodes, said electrodes being continuous so as to present an uninterrupted pressure surface throughout the full length of the seam and being deformable upon application of welding pressure and resilient so as to be adapted by reason of their inherent quality of returning after each pressure deformation to their normal cross section for applying follow up pressure as fusion of the seam takes place, passing current through the electrodes and the gripped seam to provide a one shot fusing and welding of the metal in the lap seam throughout the full length thereof, and utilizing the modulus of elasticity of the electrodes returning from deformed shape toward the normal shape thereof during the fusing of the metal to progressively apply follow up pressure effective to reduce the thickness of the lapped and fused seam edge portions approximately to the thickness of the sheet metal of which the seam is composed.

5. The herein described method of welding elongated lap seams which comprises, placing the lap seam between opposing deformable and elastic tubular electrodes extending in parallel relation the full length of the seam to be welded, bringing the electrodes together against the seam to tightly grip the seam between them and deform the electrodes from a circular cross section to an elliptical cross section, passing electric current through the electrodes and the gripped seam to provide a one shot fusing and welding of the metal in the lap seam throughout the full length thereof, and holding the electrodes against the seam during the fusing of the metal so that the cross sections thereof returning from deformed elliptical toward normal circular will apply residual pressure effective to reduce the thickness of the welded seam.

6. The herein described method of welding elongated lap seams which comprises, placing the lap seam between opposing elongated electrodes extending in parallel relation the full length of the seam to be welded, one said electrode being deformable elastic and tubular, bringing the electrodes together against the seam to tightly grip the seam between them and deform the tubular electrode from a circular cross section to an elliptical cross section, passing electric current through the electrodes and the gripped seam to provide a one shot fusing and welding of the metal in the lap seam throughout the full length thereof, and holding the electrodes against the seam during the fusing of the metal so that the cross section of the tubular electrode returning from deformed elliptical toward normal circular will apply residual pressure effective to reduce the thickness of the welded seam.

7. The herein described method of welding elongated lap seams which comprises, placing the lap seam between opposing elongated electrodes extending in parallel relation the full length of the seam to be welded, one said electrode being deformable elastic and tubular and movable toward and from the other electrode, moving the tubular electrode against the seam to tightly grip the seam between the electrodes and deform the tubular electrode from a circular cross section to an elliptical cross section, passing electric current through the electrodes and the gripped seam to provide a one shot fusing and welding of the metal in the lap seam throughout the full length thereof, and holding the grip on the seam during the fusing of the metal so that the cross section of the tubular electrode returning from deformed elliptical toward normal circular will apply residual pressure effective to reduce the thickness of the seam.

8. The herein described method of welding elongated lap seams which comprises, presenting the edge portions forming the seam in overlapping relation with said edge portions lapping not more than one thirty-second of an inch and between opposing elongated electrodes extending in parallel relation the full length of the seam to be welded, one said electrode being deformable elastic and tubular and movable toward and from the other electrode, moving the tubular electrode against the seam to tightly grip the seam between the electrodes and deform the tubular electrode from a circular cross section to an elliptical cross section, passing electric current through the electrodes and the gripped seam to provide a one shot fusing and welding of the metal in the lap seam throughout the full length thereof, and holding the grip on the seam during the fusing of the metal so that the cross section of the tubular electrode returning from deformed elliptical toward normal circular will apply residual pressure effective to reduce the thickness of the lapped and fused edge portions approximately to the thickness of the sheet metal of which the seam is formed.

9. The method defined in claim 1 wherein a multiple of individual elongated lap seam welds performed in the manner defined are formed in a single work piece which is fed step-by-step between the electrodes to bring about the sequential one shot welds, and wherein the work piece is thereafter divided into unit pieces each including one such weld.

10. The method defined in claim 8 wherein a multiple of individual elongated lap seam welds performed in the manner defined are formed in a single work piece which is fed step-by-step between the electrodes to bring about the sequential one shot welds, and wherein the work piece is thereafter divided into unit pieces each including one such weld.

11. In apparatus of the character described, a pair of opposing elongated electrodes dimensioned to extend full length of a seam to be welded, means for placing a work piece having an elongated lap seam in position for presenting the seam between the electrodes for simultaneous contact throughout its length by said electrodes, means for bringing about relative movement between the electrodes to press them against the seam, said electrodes being continuous so as to present an uninterrupted pressure surface throughout the full length of the seam and being deformable upon application of welding pressure and resilient so as to be adapted by reason of their inherent quality of returning after each pressure deformation to their normal cross section for applying follow up pressure as fusion of the seam takes place, and means for passing electric current through the electrodes and the seam thus gripped to provide a one shot fusing and welding of the metal in the lap seam throughout the full length thereof.

12. In apparatus of the character described, a pair of cylindrical electrodes opposing one another with their axes parallel, means for placing between the electrodes a work piece having a lap seam formed of edge portions overlapping to an extent not exceeding one thirty-second of an inch and in position for being engaged in line contact by said electrodes along and simultaneously throughout the full length of the seam lap, means for bringing about relative movement between the electrodes to press them against the seam, said electrodes being continuous so as to present an uninterrupted pressure surface throughout the full length of the seam and being deformable upon application of welding pressure and resilient so as to be adapted by reason of their inherent quality of returning after each pressure deformation to their normal cross section for applying follow up pressure as fusion of the seam takes place, and means for passing electric current through the electrodes and the seam thus gripped to provide a one shot fusing and welding of the metal in the lap seam throughout the full length thereof.

13. In apparatus of the character described, a pair of elongated electrodes opposing one another in parallel relation, means for placing between the electrodes a work piece having a lap seam formed of edge portions overlapping and in position for being engaged in line contact by said electrodes along and simultaneously throughout the full length of the seam lap, means for bringing about relative movement between the electrodes to press them against the seam, and means for passing electric current through the electrodes and the seam thus gripped to provide a one shot fusing and welding of the metal in the lap seam throughout the full length thereof, at least one of said electrodes being deformable and elastic throughout the seam engaging length thereof so as to be deformable as it initially grips the seam, and then as the fusing of the metal of the seam is in progress is effective to return toward its normal shape and by so doing apply follow up pressure effective to reduce the thickness of the seam.

14. In apparatus of the character described, a pair of elongated electrodes opposing one another in parallel relation, means for placing between the electrodes a work piece having a lap seam formed of edge portions overlapping and in position for being engaged in line contact by said electrodes along and simultaneously throughout the full length of the seam lap, means for bringing about relative movement between the electrodes to press them against the seam, and means for passing electric current through the electrodes and the seam thus gripped to provide a one shot fusing and welding of the metal in the lap seam throughout the full length thereof, each said electrode being deformable and elastic throughout the seam engaging length thereof so as to be deformable as it initially grips the seam, and then as the fusing of the metal of the seam is in progress is effective to return toward its normal shape and by so doing apply follow up pressure effective to reduce the thickness of the seam.

15. In apparatus of the character described, a pair of elongated electrodes opposing one another in parallel relation, means for placing between the electrodes a work piece having a lap seam formed of edge portions overlapping and in position for being engaged in line contact by said electrodes along and simultaneously throughout the full length of the seam lap, means for bringing about relative movement between the electrodes to press them against the seam, and means for passing electric current through the electrodes and the seam thus gripped to provide a one shot fusing and welding of the metal in the lap seam throughout the full length thereof, at least one of said electrodes comprising a cylindrical tubular body deformable and elastic throughout the seam engaging length thereof so as to be deformable from its circular cross section to a non-round cross section as it initially grips the seam, and then as the fusing of the metal of the seam is in progress is subject to rapidly return toward its normal circular cross section and in so doing to apply follow up pressure effective to reduce the thickness of the seam.

16. In apparatus of the character described, a pair of elongated electrodes opposing one another in parallel relation, means for placing between the electrodes a work piece having a lap seam formed of edge portions overlapping and in position for being engaged in line contact by said electrodes along and simultaneously throughout the full length of the seam lap, means for bringing about relative movement between the electrodes to press them against the seam, and means for passing electric current through the electrodes and the seam thus gripped to provide a one shot fusing and welding of the metal in the lap seam throughout the full length thereof, each said electrode comprising a cylindrical tubular body deformable and elastic throughout the seam engaging length thereof so as to be deformable from its circular cross section to a non-round cross section as it initially grips the seam, and then as the fusing of the metal of the seam is in progress is subject to rapidly return toward its normal circular cross section and in so doing to apply follow up pressure effective to reduce the thickness of the seam.

17. In apparatus of the character described, a pair of cylindrical electrodes opposing one another with their axes parallel, means for placing between the electrodes a work piece having a lap seam formed of edge portions overlapping to an extent not exceeding one thirty-second of an inch and in position for being engaged in line contact by said electrodes along and simultaneously throughout the full length of the seam lap, means for bringing about relative movement between the electrodes to press them against the seam, and means for passing electric current through the electrodes and the seam thus gripped to provide a one shot fusing and welding of the metal in the lap seam throughout the full length thereof, each said electrode comprising a cylindrical tubular body deformable and elastic throughout the seam engaging length thereof so as to be deformable from its circular cross section to an oval cross section as it initially grips the seam, and then as the fusing of the metal of the seam is in progress is subject to rapidly return toward its normal circular cross section and in so doing to apply follow up pressure effective to reduce the thickness of the seam to approximately the thickness of the sheet metal of which the seam is composed.

18. In apparatus of the character described, a pair of cylindrical deformable and elastic tubular electrodes opposing one another with their axes parallel and dimensioned to extend lengthwise of a seam to be welded, means for successively placing work pieces having laps in position between the electrodes for having the electrodes engage in line contact along the length of the laps, means for bringing about relative movement between the electrodes to first space them apart to receive a work piece, and then to bring them together to grip the work piece laps and deform the electrodes from a cylindrical cross section to a non-round cross section, means for passing current through the electrodes and the gripped laps to bring about a welding of the laps, and means for imparting small increment uni-directional rotation to the electrodes following each welding cycle to assure the progressive presentation of fresh welding surfaces to the work.

19. Apparatus as defined in claim 18 wherein there is included means for stationarily mounting one of the electrodes, and means for moving the other electrode toward and from said one electrode.

20. In apparatus of the character described, a pair of cylindrical deformable and elastic tubular electrodes opposing one another with their axes parallel and dimensioned to extend the length of a seam to be welded, means for successively placing work pieces having overlaps in position between the electrodes for having the electrodes engage in line contact along the length of the overlaps, means for bringing about relative movement between the electrodes to first space them apart to receive a work piece, and then to bring them together to grip the work piece overlaps and deform the electrodes from a cylindrical cross section to a non-round cross section, means for passing current through the electrodes and the gripped overlaps to bring about a welding of the seam, and means for adjusting the position of one electrode relative to the other for wear compensation and pressure application adjusting purposes.

21. In apparatus of the character described, a pair of cylindrical deformable and elastic tubular electrodes opposing one another with their axes parallel and dimensioned to extend full length of a seam to be welded, means for successively placing work pieces having overlaps in position between the electrodes for having the electrodes engage in line contact along the full length of each lap seam, means for bringing about relative movement between the electrodes to first space them apart to receive a work piece, and then to bring them together to grip the overlaps and deform the electrodes from a cylindrical cross section to a non-round cross section, means for passing current through the electrodes and the gripped overlaps to bring about a welding of the overlaps, and longitudinally adjustable wedge means backing up each electrode.

22. Apparatus as defined in claim 18 wherein there is included means for stationarily mounting one of the electrodes, and means for moving the other electrode toward and from said one electrode, and wherein a rotational movement imparting means is associated with each electrode and includes an actuator shaft having a worm gear couple with the respective electrode, a uni-directional overrunning clutch on each actuator shaft, and a follower projecting from the clutch, there also being included means engageable with the clutch followers for driving the clutches on each return stroke of the movable electrode away from the fixed electrode.

23. In apparatus of the character described, a pair of cylindrical deformable and elastic tubular electrodes opposing one another with their axes parallel and dimensioned to extend the length of a seam to be welded, means for successively placing work pieces having lap seams in position between the electrodes for having the electrodes engage in line contact along the full length of each lap seam, means for bringing about relative movement between the electrodes to first space them apart to receive a work piece, and then to bring them together to grip the work piece and deform the electrodes from a cylindrical cross section to a non-round cross section, means for passing current through the electrodes and a gripped lap seam to bring about a welding of the seam, means for stationarily mounting one of the electrodes, a movable carrier supporting the other electrode and having a follower roller thereon, said means for bringing about relative movement between the electrodes comprising rotary cam means engaging the roller and effective to control the position of the movable electrode, and means for holding the roller against the cam.

24. In apparatus of the character described, a pair of cylindrical deformable and elastic tubular electrodes opposing one another with their axes parallel and dimensioned to extend the length of a seam to be welded, means for successively placing work pieces having lap seams in position between the electrodes for having the electrodes engage in line contact along the length of each lap seam, means for bringing about relative movement between the electrodes to first space them apart to receive a work piece, and then to bring them together to grip the work piece and deform the electrodes from a cylindrical cross section to a non-round cross section, means for passing current through the electrodes and a gripped lap seam to bring about a welding of the seam, means for stationarily mounting one of the electrodes, a movable carrier supporting the other electrode and having a follower roller thereon, said means for bringing about relative movement between the electrodes comprising rotary cam means engaging the roller and effective to control the position of the movable electrode, and means for holding the roller against the cam, said roller being mounted on an eccentric stud which is turnable in the carrier to vary the position of the roller on the carrier and the relation of the movable electrode to the electrode position controlling cam.

25. In apparatus of the character described, a pair of cylindrical deformable and electric tubular electrodes opposing one another with their axes parallel and dimensioned to extend the length of a seam to be welded, means for successively placing work pieces having overlaps in position between the electrodes for having the electrodes engage in line contact lengthwise of the overlaps, means for bringing about relative movement between the electrodes to first space them apart to receive a work piece, and then to bring them together to grip the work piece and deform the electrodes from a cylindrical cross section to a non-round cross section, means for passing current through the electrodes and the gripped laps to bring about a welding of the laps, means for stationarily mounting one of the electrodes, a movable carrier supporting the other electrode and having a follower roller thereon, said means for bringing about relative movement between the electrodes comprising rotary cam means engaging the roller and effective to move the movable electrode toward the stationary electrode, and pneumatic actuated means for holding the movable electrode carrier follower roller against the cam and for moving the movable electrode away from the stationary electrode.

26. In apparatus of the character described, a pair of cylindrical deformable and elastic tubular electrodes opposing one another with their axes parallel and dimensioned to extend full length of a seam to be welded, means for successively placing work pieces having overlaps in position between the electrodes for having the electrodes engage in line contact along the length of the overlaps, means for bringing about relative movement between the electrodes to first space them apart to receive a work piece, and then to bring them together to grip the work piece laps and deform the electrodes from a cylindrical cross section to a non-round cross section, means for passing current through the electrodes and the gripped laps to bring about a welding of the laps, means for stationarily mounting one of the electrodes, means for moving the other electrode toward and from said stationary electrode, a carrier for the movable electrode, a block having a quick detachable mounting on the carrier, and means providing a quick detachable mounting for the movable electrode on the block.

27. In apparatus of the character described, a pair of cylindrical deformable and elastic tubular electrodes opposing one another with their axes parallel and dimensioned to extend lengthwise of a seam to be welded, means for successively placing work pieces having laps in position between the electrodes for having the electrodes engage in line contact along the length of the laps, means for bringing about relative movement between the electrodes to first space them apart to receive a work piece, and then to bring them together to grip the work piece laps and deform the electrodes from a cylindrical cross section to a non-round cross section, means for passing current through the electrodes and the gripped laps to bring about a welding of the seams, means for stationarily mounting one of the electrodes, means for moving the other electrode toward and from said stationary electrode, a carrier for the movable electrode, a block having a quick detachable mounting on the carrier, a longitudinally adjustable back up wedge interposed between the movable electrode and the block, and means providing a quick detachable mounting for the movable electrode on the block.

28. In apparatus of the character described, a pair of cylindrical deformable and elastic tubular electrodes opposing one another with their axes parallel and dimensioned to extend lengthwise of a seam to be welded, means for successively placing work pieces having laps in position between the electrodes for having the electrodes engage in line contact along the length of the laps, means for bringing about relative movement between the electrodes to first space them apart to receive a work piece, and then to bring them together to grip the work piece laps and deform the electrodes from a cylindrical cross section to a non-round cross section, means for passing current through the electrodes and the gripped laps to bring about a welding of the seams, and means for circulating a coolant through both electrodes and including an inlet flow tube extending into one end of each electrode and terminating within the electrode adjacent its other end and being spaced inwardly within the hollow of the electrode to provide an annular outlet passage surrounding the flow tube and discharging the coolant at the same end of the electrode at which it entered.

29. In apparatus of the character described, a pair of cylindrical deformable and elastic tubular electrodes opposing one another with their axes parallel and dimensioned to extend lengthwise of a seam to be welded, means for successively placing work pieces having laps in position between the electrodes for having the electrodes engage in line contact along the length of the laps, means for bringing about relative movement between the electrodes to first space them apart to receive a work piece, and then to bring them together to grip the work piece laps and deform the electrodes from a cylindrical cross section to a non-round cross section, means for passing current through the electrodes and the gripped laps to bring about a welding of the seam, one said electrode being mounted on a fixed plate and the other electrode being mounted on a movable carrier and there being included means for moving the carrier and the movable electrode toward and from the stationary electrode, said fixed plate being connected in the current passing circuit and said carrier being attached to a flexible lead also connected in the current passing circuit and having a boot partially surrounding the same and forming a coolant receiving chamber about the lead, and there also being included passages for circulating a coolant through the fixed plate and carrier and the boot.

30. Apparatus as defined in claim 29 wherein there are included passages for circulating a coolant through both electrodes and including an inlet flow tube extending into one end of each electrode and terminating within the electrode adjacent its other end and being spaced inwardly within the hollow of the electrode to provide an annular outlet passage surrounding the flow tube and discharging the coolant at the same end of the electrode at which it entered.

31. Apparatus as defined in claim 18 wherein there is included means for stationarily mounting one of the electrodes, and means for moving the other electrode toward and from said stationary electrode, and wherein rotational movement imparting means is associated with each electrode and includes an actuator shaft having a worm gear couple with the respective electrode, a uni-directional overrunning clutch on each actuator shaft, and a follower projecting from the clutch, means engageable with the clutch followers for operating the clutches and including an actuator movable with the movable electrode and engaging the follower projecting from the clutch associated with the stationary electrode, and a stationarily mounted cam engaging the follower projecting from the clutch associated with the movable electrode.

32. In apparatus of the character described, a pair of cylindrical deformable and elastic tubular electrodes opposing one another with their axes parallel and dimensioned to extend lengthwise of a seam to be welded, means for successively placing work pieces having laps in position between the electrodes for having the electrodes engage in line contact along the length of the laps, means for bringing about relative movement between the electrodes to first space them apart to receive a work piece, and then to bring them together to grip the work piece laps and deform the electrodes from a round cross section to a non-round cross section, means for passing current through the electrodes and the gripped laps to bring about a welding of the laps, and means for imparting small increment uni-directional rotation to the electrodes following each welding cycle to assure the progressive presentation of a fresh welding surface to the work, means for stationarily mounting one of the electrodes, a movable carrier supporting the other electrode and having a follower roller thereon, said means for bringing about relative movement between the electrodes comprising a rotary cam engaging the roller and effective to control the position of the movable electrode, and means for holding the roller against the cam, said current passing means including a circuit controlling switch and a timing cam rotatable with said rotary cam and engageable with said switch.

33. In apparatus of the character described, a pair of cylindrical deformable and elastic tubular electrodes opposing one another with their axes parallel and dimensioned to extend lengthwise of a seam to be welded, means for successively placing work pieces having laps in position between the electrodes for having the electrodes engage in line contact along the length of the laps, means for bringing about relative movement between the electrodes to first space them apart to receive a work piece, and then to bring them together to grip the work piece laps and deform the electrodes from a round cross section to a non-round cross section, means for passing current through the electrodes and the gripped laps to bring about a welding of the laps, and means for stationarily mounting one of the electrodes, a movable carrier supporting the other electrode and having a follower roller theron, said means for bringing about relative movement between the electrodes comprising a rotary cam engaging the roller and effective to control the position of the movable electrode, the electrodes being so spaced that when the movable electrode is at full stroke toward the opposing electrode the distance between centers of the electrodes will be slightly less than the sum of the radii of the electrodes, whereby the electrodes will be slightly deformed on mutual pressure contact even when no work is gripped between them.

References Cited in the file of this patent
UNITED STATES PATENTS

| Number | Name | Date |
|---|---|---|
| 1,544,201 | Waters | June 30, 1925 |
| 1,773,892 | Toleik | Aug. 26, 1930 |
| 1,869,188 | Eckman | July 26, 1932 |
| 1,880,535 | Von Henke | Oct. 4, 1932 |
| 2,209,286 | Sebell | July 23, 1940 |
| 2,314,099 | Mikhalapov | Mar. 16, 1943 |
| 2,663,784 | Iversen | Dec. 22 1953 |